2,748,134

AMIDE-LIKE DERIVATIVES OF PIPERIDINE

Arthur Stoll, Arlesheim, near Basel, and Jean Pierre Bourquin, Basel, Switzerland, assignors to Sandoz A. G., Basel, Switzerland, a Swiss firm No Drawing. Application January 12, 1954,
Serial No. 403,634

Claims priority, application Switzerland January 20, 1953

7 Claims. (Cl. 260—294)

The present invention relates to amide-like derivatives of piperidine. More particularly, it has especial relation to therapeutically useful piperidine derivatives which correspond to the formula

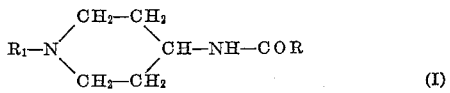
(I)

wherein $R_1$ stands for alkyl, R stands for

or for

$R_2$ being a hydrogen atom or a nitro, alkyl, alkylamino, alkoxy or alkoxyalkylamino group or a halogen atom. The term "alkyl" refers here to lower alkyl, such as methyl, ethyl, propyl, butyl or the like, and the term "alkoxy" refers to lower alkoxy, such as methoxy, ethoxy, propoxy, butoxy or the like.

The aforesaid compounds corresponding to Formula I are prepared, according to the present invention by reacting the corresponding amino-piperidines of formula

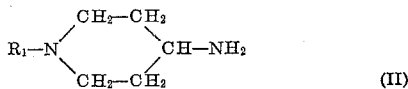
(II)

with a carboxylic acid acyl halide of the formula halogen—COR          (III)

where $R_1$ and R have the precedingly-indicated significances. The process may be carried out, for example, by treating the corresponding 1-lower-alkyl-4-amino-piperidine with the appropriate acyl halide in an organic solvent, e. g. benzene or toluene, and allowing the reaction to proceed at room temperature (e. g. at 20–30° C.) and/or accelerating or completing the reaction by heating the reaction mixture to a higher temperature (e. g. by boiling under reflux). The 1-lower-alkyl-4-acylamino-piperidine obtained in this way is advantageously purified by recrystallization from a suitable solvent, such as benzene, alcohol, acetone or the like.

A characteristic feature of the products thus obtained according to the present invention is that they are crystalline and form stable salts with acids. These properties are of great advantage inter alia as regards correct dosing and also in connection with the preparation of pure products. These features are particularly desirable with products, such as those of the present invention, which are intended to be employed medicinally.

The aforesaid salts of the products of the invention are salts with therapeutically applicable inorganic and organic acids, such for example as hydrohalic acids (e. g. hydrochloric acid, hydrobromic acid or hydriodic acid), sulfuric acid, alkyl- or aryl-sulfonic acids (e. g. methane- or ethane-sulfonic acid or toluene-sulfonic acid), acetic acid, propionic acid, succinic acid, tartaric acid, citric acid or benzoic acid.

The products prepared according to this invention are valuable medicaments and are used in cardiac therapy for combating arrhythmias, e. g. auricular fibrillation and especially ventricular tachycardia, as well as in anaesthesiology for the prevention of arrhythmias occurring during operations on the heart or as side effects of anaesthetics. They are effective when given by mouth, but can also be used intravenously.

The following examples illustrate the invention with respect to presently preferred representative embodiments thereof; it will be understood that it is not intended to restrict the invention to these exemplary embodiments. In the said examples, parts by weight bear the same relation to parts by volume as do grams to milliliters. Percentages are by weight, and temperatures are in degrees centigrade.

Example 1

46.0 parts by weight of 1-methyl-4-amino-piperidine (2 mols) are dissolved in 150 parts by volume of benzene, and a solution of 68.0 parts by weight of benzoyl chloride (1 mol) in 150 parts by volume of benzene is added dropwise at room temperature. The reaction mixture is allowed to stand overnight or is boiled for about one hour under reflux. The benzene solution, together with the precipitate, is then shaken out with 150 parts by volume of 1.5 N hydrochloric acid and the aqueous extract made alkaline to phenolphthalein by addition of 3 N caustic soda. This results in precipitation of the base, 1-methyl-4-benzoyl-amino-piperidine, which is filtered off and recrystallized from 20 volumes of benzene. The product melts at 164–165°. It corresponds to the formula

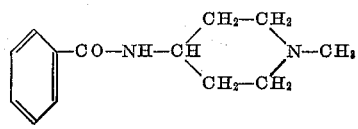

If the so-obtained amide is dissolved in the equivalent quantity of 1 N hydrochloric acid, the solution evaporated to dryness under reduced pressure at 50°, and the residue dissolved in 14 volumes of boiling 70% aqueous acetone, the hydrochloride of 1-methyl-4-benzoyl-amino-piperidine ($C_{13}H_{18}ON_2 \cdot HCl \cdot 1/2H_2O$) separates out in crystalline form on cooling. It melts, after previous sintering, at 207–209°.

By proceeding as aforedescribed in the present example, but replacing the 1-methyl-4-amino-piperidine by the equivalent quantity of another 1-lower-alkyl-4-amino-piperidine, such for instance as 1-ethyl- or 1-propyl- or 1-butyl-4-amino-piperidine, the corresponding 1-ethyl- or 1-propyl- or 1-butyl-4-benzoylamino-piperidine is obtained.

Example 2

32.0 parts by weight of 1-methyl-4-amino-piperidine (2 mols) are dissolved in 250 parts by volume of benzene, and a solution of 55.0 parts by weight of p-nitro-benzoyl chloride (1 mol) in 250 parts by volume of benzene is added dropwise at room temperature. The reaction mixture is allowed to stand overnight or is boiled for approximately 1 hour under reflux. The benzene solution, together with the precipitate is shaken out with 300 parts by volume of 1.5 N hydrochloric acid and the aqueous extract made alkaline to phenolphthalein by addition of 3 N caustic soda. The base, 1-methyl-4-(p-nitro-benzoyl)-amino-piperidine, precipitated in this way is filtered off and recrystallized from a boiling mixture of 7 volumes acetone and 3 volumes absolute alcohol.

The product melts at 197–198°. It corresponds to the formula

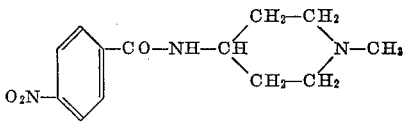

If the so-obtained amide is dissolved in the equivalent quantity of 1 N hydrochloric acid, the solution evaporated to dryness under reduced pressure at 50° and the residue dissolved in 7 volumes of boiling 92% aqueous alcohol, the hydrochloride of 1-methyl-4-(p-nitro-benzoyl)-amino-piperidine ($C_{13}H_{17}O_3N_3.HCl$) crystallizes out on cooling. It melts at 253–255°.

*Example 3*

46.0 parts by weight of 1-methyl-4-amino-piperidine (2 mols) are dissolved in 150 parts by volume of benzene, and a solution of 82.8 parts by weight of p-methoxy-benzoyl chloride (anisoyl chloride) (1 mol) in 150 parts by volume of benzene is added dropwise at room temperature. The reaction mixture is allowed to stand overnight and then boiled for 1–2 hours under reflux. The benzene solution, together with the precipitate, is shaken out with 300 parts by volume of 1.5 N hydrochloric acid and the aqueous extract made alkaline to phenolphthalein by addition of 3 N caustic soda. This results in precipitation of the base, 1-methyl-4-(p-methoxy-benzoyl)-amino-piperidine, which is filtered off and recrystallized from 8 volumes of acetone. The product melts at 170–171°. It corresponds to the formula

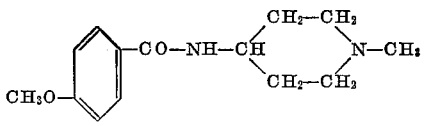

If the so-obtained amide is dissolved in the equivalent quantity of 1 N hydrochloridic acid, the solution evaporated to dryness under reduced pressure at 50°, the residue dissolved in 4 volumes of boiling absolute alcohol, and 4 volumes of ether added, the hydrochloride of 1 - methyl - 4 - (p - methoxy - benzoyl) - amino - piperi - dine ($C_{14}H_{20}O_2N_2.HCl.1/2H_2O$) separates out in crystalline form. It melts at 223–225°.

*Example 4*

A solution of 63.0 parts by weight of p-ethoxy-benzoyl chloride (1 mol + 10% excess) in 150 parts by volume of benzene is treated at room temperature with a solution of 35.0 parts by weight of 1-methyl-4-amino-piperidine (1 mol) in 150 parts by volume of benzene, added dropwise. The reaction mixture is allowed to stand overnight, and then boiled for one hour under reflux. The benzene solution, together with the precipitate, is shaken out with 300 parts by volume of 1.5 N hydrochloric acid and the aqueous extract made alkaline to phenolphthalein by addition of 3 N caustic soda. This results in precipitation of the base, 1-methyl-4-(p-ethoxy-benzoyl)-amino-piperidine, which is filtered off and recrystallized from 8 volumes of acetone. The product melts at 182–184°. It corresponds to the formula

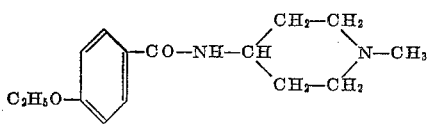

If the so-obtained amide is dissolved in the equivalent quantity of 1 N hydrochloric acid, the solution evaporated to dryness under reduced pressure at 50°, the residue dissolved in 4 volumes of boiling absolute alcohol, and the solution mixed with 2–3 volumes of ether, the hydrochloride of 1-methyl-4-(p-ethoxy-benzoyl)-amino-piperidine ($C_{15}H_{22}O_2N_2.HCl.H_2O$) crystallizes out. It melts at 243–246°.

*Example 5*

93.0 parts by weight of p-n-butoxy-benzoyl chloride (1 mol) are dissolved in 400 parts by volume of benzene, and a solution of 50.0 parts by weight of 1-methyl-4-amino-piperidine (1 mol) in 400 parts by volume of benzene is added dropwise at room temperature. The reaction mixture is allowed to stand overnight and is then boiled for one hour under reflux. The benzene solution, together with the precipitate, is first freed as far as possible from benzene, the concentration being carried out under reduced pressure at 50° to avoid frothing. The residue is taken up in 600 parts by volume of ether and shaken out with 400 parts by volume of 1.5 N hydrochloric acid. The aqueous extract is made alkaline to phenolphthalein with 3 N caustic soda and the base, 1-methyl-4-(p-n-butoxy-benzoyl)-amino-piperidine, which is precipitated, is filtered off and recrystallized from 5–8 volumes acetone. The product melts at 171–172°. It corresponds to the formula

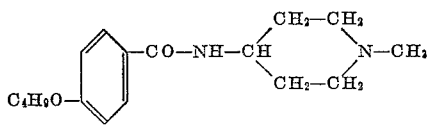

If the so-obtained amide is dissolved in the equivalent quantity of 1 N hydrochloric acid, the solution evaporated to dryness under reduced pressure at 50°, the residue dissolved in 4 volumes of boiling absolute alcohol, and the solution mixed with 2 vols. of ether, the hydrochloride of 1 - methyl - 4 - (p-n-butoxy-benzoyl)-amino-piperidine ($C_{17}H_{26}O_2N_2.HCl$) separates out in crystalline form. It melts at 205–207°.

*Example 6*

53.0 parts by weight of p-methyl-benzoyl chloride (1 mol + 10% excess) are dissolved in 150 parts by volume of benzene, and a solution of 35.0 parts by weight of 1-methyl-4-amino-piperidine (1 mol) in 150 parts by volume of benzene is added dropwise at room temperature. The reaction mixture is allowed to stand overnight and then boiled for one hour under reflux. The benzene solution, together with the precipitate is shaken out with 300 parts by volume of 1.5 N hydrochloric acid, and the aqueous extract made alkaline to phenolphthalein with 3 N caustic soda. This results in precipitation of the base, 1-methyl-4-(p-methyl-benzoyl) - amino - piperi-dine, which is filtered off and recrystallizes from 15 volumes of aqueous alcohol. The product melts at 189–191°. It corresponds to the formula

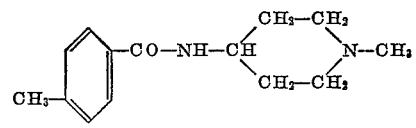

If the so-obtained amide is dissolved in the equivalent quantity of 1 N hydrochloric acid, the solution evaporated to dryness under reduced pressure at 50°, the residue dissolved in 4 volumes of boiling absolute alcohol, and 4 volumes of ether added, the hydrochloride of 1-methyl-4 - (p - methyl - benzoyl) - amino - piperidine ($C_{14}H_{20}ON_2.HCl$) crystallizes out. It melts at 239–242°.

By proceeding as aforedescribed in the present example, but replacing the p-methyl-benzoyl chloride by the equivalent quantity of another p-lower alkyl-benzoyl chloride, the corresponding product, e. g. 1-methyl-4-(p-ethyl-benzoyl)-amino-piperidine, 1-methyl-4-(p-propyl-benzoyl)-amino-piperidine, 1-methyl-4-(p-butyl-benzoyl)-amino-piperidine, is obtained.

*Example 7*

46.0 parts by weight of 1-methyl-4-amino-piperidine (2 mols) are dissolved in 150 parts by volume of benzene, and a solution of 85.0 parts by weight of p-chloro-benzoyl chloride (1 mol) in 150 parts by volume of benzene is added dropwise at room temperature the reaction mixture is allowed to stand overnight and then boiled for one hour under reflux. The benzene solution, together with the precipitate is shaken out with 300 parts by volume of 1.5 N hydrochloric acid, and the aqueous extract made alkaline to phenolphthalein by addition of 3 N caustic soda. This results in precipitation of the base, 1-methyl-4-(p-chlorobenzoyl)-amino-piperidine, which is filtered off and recrystallized from 9 volumes of absolute alcohol. The product melts at 230–232°. It corresponds to the formula

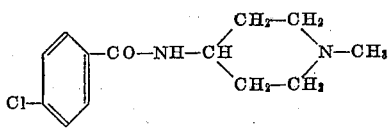

If the so-obtained amide is dissolved in the equivalent quantity of hydrochloric acid, the solution evaporated to dryness under reduced pressure at 50°, the residue dissolved in 4 volumes of boiling absolute alcohol, and the solution mixed with 4 volumes of acetone and 4 volumes of ether, the hydrochloride of 1-methyl-4-(p-chloro-benzoyl)-amino-piperidine ($C_{13}H_{17}ON_2Cl.HCl.1/2H_2O$) crystallizes out. It melts at 217–219°.

If the p-chloro-benzoyl chloride in the first paragraph of the present example is replaced by an equivalent quantity of another p-halogen-benzoyl halide, as for instance the p-bromo-benzoyl chloride or bromide, the corresponding p-halogen derivative, e. g. the 1-methyl-4-(p-bromo-benzoyl)-amino-piperidine, is obtained.

*Example 8*

A suspension of 109.0 parts by weight of p-butyl-amino-benzoyl chloride hydrochloride (1 mol) in 50 parts by volume of benzene is treated at room temperature with a solution of 110.0 parts by weight of 1-methyl-4-amino-piperidine (about 2 mols) in 500 parts by volume of benzene, added dropwise. The reaction mixture is allowed to stand overnight at 20° and is then boiled for 1 hour under reflux. The benzene solution, together with the precipitate, is shaken out with 800 parts by volume of 1.5 N hydrochloric acid, and the aqueous extract made alkaline to phenolphthalein by addition of 3 N caustic soda. The precipitated base is taken up in 900 parts by volume of chloroform, the solution dried with 150 parts by weight of potash, filtered, freed from chloroform under reduced pressure at 50°, and the residue dissolved in approximately 130 parts by volume of boiling acetone. On treating the solution with 150 parts by volume of ether, 1-methyl-4-(p-n-butyl-amino-benzoyl)-amino-piperidine crystallizes out. The product melts at 165–167°. It corresponds to the formula

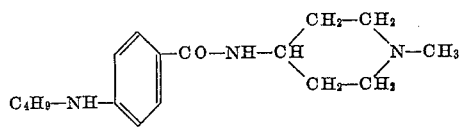

If the so-obtained amide is dissolved in the equivalent quantity of 1 N hydrochloric acid, the solution evaporated to dryness under reduced pressure at 50°, the residue dissolved in 20 volumes of boiling absolute alcohol, and the solution mixed with 40 volumes of ether, the hydrochloride of 1-methyl-4-(p-n-butyl-amino-benzoyl)-amino-piperidine ($C_{17}H_{27}ON_3.HCl$) crystallizes out. It melts at 233–235°.

If the p-butylamino-benzoyl chloride hydrochloride in the first paragraph of the present example is replaced by an equivalent quantity of another p-lower-alkylamino-benzoyl-chloride hydrochloride, the corresponding product, e. g. 1-methyl-4-(p-methylamino-benzoyl)-amino-piperidine, 1-methyl-4-(p-ethylamino-benzoyl)-amino-piperidine, 1-methyl-4-(p-propylamino-benzoyl)-amino-piperidine, is obtained.

*Example 9*

60.0 parts by weight of p-methoxy-ethylamino-benzoyl chloride hydrochloride (1 mol) are suspended in 300 parts by volume of benzene, and a solution of 57.0 parts by weight of 1-methyl-4-amino-piperidine (about 2 mols) in 200 parts by volume of benzene is added dropwise at room temperature. The reaction mixture is allowed to stand overnight and is then boiled for 1 hour under reflux. The benzene solution, together with the precipitate, is shaken out with 400 parts by volume of 1.5 N hydrochloric acid, and the aqueous extract made alkaline to phenolphthalein by addition of 3 N caustic soda. The base separates out in the form of an oil which is taken up in 400 parts by volume of chloroform, the solution dried with 170 parts by weight of potash, filtered, freed from chloroform under reduced pressure at 50°, and the residue dissolved in 70 parts by volume of boiling acetone. On treating the solution with 70 parts by volume of ether, 1-methyl-4-(p-methoxy-ethylamino-benzoyl)-amino-piperidine separates out in crystalline form. The product melts at 143–145°. It corresponds to the formula

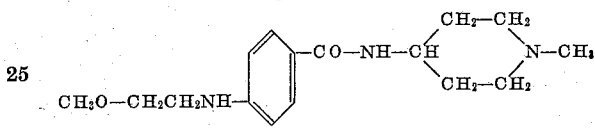

If the so-obtained amide is dissolved in the equivalent quantity of 1 N hydrochloric acid, the solution evaporated to dryness under reduced pressure at 50°, the residue dissolved in 20 volumes of boiling absolute alcohol, and the solution mixed with 30 volumes of ether, the hydrochloride of 1-methyl-4-(p-methoxy-ethylamino-benzoyl)-amino-piperidine ($C_{16}H_{25}O_2N_3.HCl$) crystallizes out. It melts at 228–230°.

If the p-methoxy-ethylamino-benzoyl chloride hydrochloride in the first paragraph of the present example is replaced by an equivalent quantity of another alkoxy-alkylaminobenzoylchloride hydrochloride, the corresponding product, e. g. 1-methyl-4-(p-ethoxy-ethylamino-benzoyl)-amino-piperidine, 1-methyl-4-(p-ethoxy-propylamino-benzoyl)-amino-piperidine, 1-methyl-4-(p-methoxy-propylamino-benzoyl)-amino-piperidine, is obtained.

*Example 10*

A solution of 274 parts by weight of 1-methyl-4-amino-piperidine (2 mols) in 400 parts by volume of benzene is cooled in ice, and a solution of 169 parts by weight of nicotinoyl chloride (1 mol) in 200 parts by volume of benzene is added dropwise with shaking. The reaction mixture is allowed to stand overnight and is then warmed for 1 hour under reflux in a water bath at 80°. After cooling, the benzene solution, together with the precipitate, is shaken out with 1000 parts by volume of water. The aqueous extract is treated with 670 parts by weight of solid potash and the reddish oil which is precipitated is separated off. For further drying, the oil is dissolved in 500 parts by volume of absolute alcohol, and the solution concentrated as far as possible under reduced pressure at 50°. The oily residue is dissolved in 600 parts by volume of boiling xylene and the solution cooled, when 1-methyl-4-(nicotinoyl)-amino-piperidine separates out in crystalline form. The base is then recrystallized from 8 volumes of ethyl acetate. The product melts at 165–167°. It corresponds to the formula

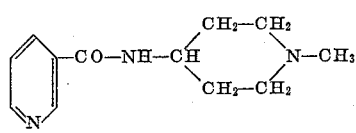

If the so-obtained base is dissolved in the equivalent quantity of 1 N hydrochloric acid, the solution evaporated to dryness under reduced pressure at 50°, the residue dissolved in 4 volumes of boiling absolute alcohol, and the solution mixed with 4 volumes of ether, the hydrochloride of 1-methyl-4-(nicotinoyl)-amino-piperidine ($C_{12}H_{17}ON_3 \cdot HCl$)

crystallizes out on cooling. It melts at 224–226°.

While, in the foregoing illustrative examples, the formation of the preferred salt, the hydrochloride, is set forth, it will be understood that by replacing the hydrochloric acid by an equivalent quantity of one of the other therapeutically applicable acids hereinbefore enumerated, the corresponding salt, for example the hydrobromide, hydriodide, sulfate, methane-sulfonate, ethane-sulfonate, toluene-sulfonate, acetate, propionate, succinate, tartrate, citrate, benzoate, etc., will be obtained in lieu of the hydrochloride.

Having thus disclosed the invention what is claimed is:

1. A compound selected from the group consisting of the piperidine derivatives corresponding to the formula

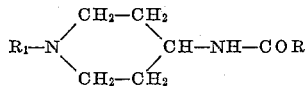

and the salts thereof with therapeutically applicable acids, wherein $R_1$ stands for a lower alkyl group, and R stands for a radical selected from the group consisting of phenyl, p-chlorophenyl, p-bromophenyl, p-nitrophenyl, p-lower alkylphenyl, p-lower alkylaminophenyl, p-lower alkoxyphenyl, p-lower ω-alkoxyalkyl-ω'-aminophenyl and β-pyridyl radicals.

2. 1-methyl-4-benzoyl-amino-piperidine.
3. 1-methyl-4-(p-nitro-benzoyl)-amino-piperidine.
4. 1-methyl-4-(p-n-butoxy-benzoyl)-amino-piperidine.
5. The hydrochloride of 1-methyl-4-(p-n-butoxy-benzoyl)-amino-piperidine.
6. 1 - methyl-4-(p-n-butylamino-benzoyl)-amino-piperidine.
7. 1-methyl-4-(nicotinoyl)-amino-piperidine.

References Cited in the file of this patent
UNITED STATES PATENTS

| | | |
|---|---|---|
| 2,073,100 | Eisleb | Mar. 9, 1937 |
| 2,666,053 | Fox | Jan. 12, 1954 |

FOREIGN PATENTS

| | | |
|---|---|---|
| 540,697 | Germany | Jan. 28, 1933 |

OTHER REFERENCES

Simons: Ind. and Eng. Chem., vol. 39, p. 238 (1947).
Cote et al.: Jour. of Bacteriology, vol. 61, pp. 463–7 (1951).
Hurd et al.: Jour. of Org. Chem., vol. 13, pp. 471–46 (1951).